Feb. 7, 1967  E. W. O'DELL ET AL  3,303,342
CALCIUM IODIDE PHOSPHORS

Filed Oct. 16, 1963  3 Sheets-Sheet 1

E. WAYNE O'DELL, GUNTHER H. DIERSSEN, AND ROBERT HOFSTADTER, INVENTORS

BY *Robert F. Mikulek*

E. WAYNE O'DELL, GUNTHER H. DIERSSEN AND ROBERT HOFSTADTER, INVENTORS

Feb. 7, 1967 E. W. O'DELL ET AL 3,303,342
CALCIUM IODIDE PHOSPHORS
Filed Oct. 16, 1963 3 Sheets-Sheet 3

E. WAYNE O'DELL, GUNTHER H. DIERSSEN AND ROBERT HOFSTADTER, INVENTORS

BY *Robert K. Mikulek*

United States Patent Office 3,303,342
Patented Feb. 7, 1967

3,303,342
CALCIUM IODIDE PHOSPHORS
Earl Wayne O'Dell, Cleveland Heights, Ohio, Gunther H. Dierssen, White Bear Lake, Minn., and Robert Hofstadter, Stanford, Calif., assignors to The Harshaw Chemical Company, Cleveland, Ohio, a corporation of Ohio
Filed Oct. 16, 1963, Ser. No. 316,665
4 Claims. (Cl. 250—71.5)

This invention relates to a new fluorescent material having particular use as a scintillator and more particularly it relates to a scintillator comprising an optically integral crystalline mass of calcium iodide and to the combination thereof with detecting means.

Fluorescent materials have been known for many years. They have been used in many areas and their use is being continually expanded. Fluorescent materials such as zinc sulfide and cadmium sulfide have been used as luminescent screens for television sets, fluoroscopes and the like.

With the advent of thallium activated sodium iodide crystals it has been possible effectively to convert high energy ionizing radiations (X-rays, gamma rays and the like) to light energy. See Hofstadter, U.S. Patent 2,585,551. Crystalline bodies of sodium iodide are produced advantageously in an optically integral mass sufficiently large to capture enough of a given radiation to be useful; they are extremely transparent and, therefore, effectively transmit their own fluorescence. When doped or activated with thallium, a sodium iodide crystal becomes an excellent scintillator having an integrated light output of about twenty times that of thallium-free sodium iodide at room temperature.

The reasons for this activation by thallium atoms and other metal atoms are not fully understood but it is uniformly agreed among those skilled in the art that many activators enhance fluorescence significantly. Recent investigations of new compositions for use as scintillators have characteristically proceeded along the lines of testing the effect of radiation on many different crystals containing small amounts of various added impurities (activators).

The thallium activated calcium iodide crystals [described in an article by Van Sciver et al., Physical Review 84, 5 (1951)] and the europium activated calcium iodide crystals (disclosed and claimed in copending application of Hofstadter, Serial No. 296,518, filed July 22, 1963) are the only compositions developed since thallium activated sodium iodide which are comparable to the activated sodium iodide in responding to radiation.

It has now been discovered that excellent scintillators may be prepared from calcium iodide which is spectrographically free of thallium and europium and without any added ingredients. The crystalline material prepared according to the present invention provides an integral transparent scintillator having an integrated light output of almost twice that of thallium activated sodium iodide crystals.

The fact that the calcium iodide crystals of the present invention manifest any significant room temperature response at all to high energy ionizing radiations is unexpected and surprising in view of the teachings of the prior art. Moreover, the results of the present invention appear to contradict, in part, the effectiveness of thallium as an activator inasmuch as thallium activated calcium iodide is only about one-half as responsive to high energy ionizing radiations as are the thallium-free crystals of the present invention.

The calcium iodide crystals of the present invention are prepared conveniently by any one of several well known procedures using reagent grade reactants preferably. The calcium iodide is then dehydrated. During dehydration, the material is preferably kept on the acid side.

The dehydrated calcium iodide is then fused and grown as a single crystal or as an optically integral polycrystalline mass according to the Stockbarger-Bridgman procedure (U.S. Patent 2,149,076) or the Kyropoulos-Czochralski procedure [Z. Phys. Chem., 92, 219 (1917)].

The resultant crystalline material, consisting of calcium iodide provides a scintillator characterized by having a fluorescent emission peak at 4100±40 angstroms. The scintillators of the present invention are optically integral and exhibit excellent light transmission having a minimum of absorption in the emitting wavelength band.

For the purposes of the present invention, the expression "optically integral" means that there is an optical coupling between parts of the whole body making it one composite mass, and a window or a reflector-free area thereon from which the emitted light is removed. In bodies with the simplest geometry over half of the light originating at any point therein travels a complex path with numerous reflections from the surface of the body or outside reflection. To be useful as a radiation detector, the efficiencies of the light paths from all points in the body to the window of an optically integral mass should be high enough to affect the detector and when surrounded by a good reflector, nearly equal. The efficiency of the paths affects the pulse height or signal strength, and the equality of efficiency of the various parts affects the resolution.

That a mass is optically integral is generally apparent to the eye of one experienced in preparing and testing devices with the material in question. It is immediately evident in the pulse height and resolution of a scintillator when other factors have proper relationship and value.

These factors for a scintillator detector device are as follows: the crystal should be optically integral, have good efficiency of energy conversion, have the desirable geometry of the mass for energy absorption, and have the desirable geometry of the mass for light emission, reflector surface quality, and window surface quality. The reflector surrounding the crystal must have a high efficiency of reflection and be uniformly fitted tightly against the surface of the crystal. The window or light-pipe which may be nothing more than a portion of the crystal's surface not covered by the reflector, must have a good uniform optical coupling with the mass of the crystal and have a good light transmitting efficiency from the crystal to the light detector.

Materials prepared by casting or by grinding to a fine powder (10–100 microns) are not optically integral; they do not provide a system which provides the characteristics as described above. Cast crystalline materials are not optically integral because of the random crystalline growth of the material. A cast crystalline body is a matrix of numerous tiny crystals and minute voids caused by the non-uniform growth pattern and shrinkage. It is possible, however, to have a substantially optically integral bulk solid (powder) if the particle size is large enough. Depending on the index of refraction, it is possible to "grow" a single crystal such as those grown by the above procedures and then reduce the crystal to a particle size above a certain limit and spread out to permit light to travel to the detector. Ideally, however, a pure optically homogeneous single crystal provides a system which is optically integral.

It should be always kept in mind that an optically integral fluorescent body does not by itself channel light along one direction. When used as a scintillator, the body is generally completely surrounded by a reflector except at the particular part of the body's surface which is to permit the light to escape.

The calcium iodide scintillators of the present invention being hygroscopic deteriorate rapidly in the ambient atmosphere. In order to take advantage of the crystal's scintillation properties, the crystals must be kept in a substantially anhydrous environment. Conveniently, the crystal is "canned" in a hermetically sealed container having an optical window providing for communication of light. The crystal may be optically coupled to the inner side of the window with an optical fluid or the crystal may be supported within the container at a suitable vantage point so the fluorescence of the crystal may be observed from the outer side of the window. Preferably, the container or a part thereof is composed of a radiation permeable material.

The calcium iodide crystals of the present invention advantageously may be used in conventional systems designed for counting radiation pulses or in systems designed for measuring integrated radiation intensities. The crystal is optically coupled to a means for converting the fluorescence of the crystal to electrical energy such as a photomultiplier tube and the like. The pulses of light emitted by the scintillator are converted to electrical signals corresponding to the energy of the radiation. If the purpose merely is to determine the number of radiation (events) particles striking the crystal, then the electrical pulses or signals leaving the photomultiplier are channeled to a scaler, or preferably a count rate meter. If the purpose is to measure the intensity of the radiation, the integrated electrical signals are selected according to intensity, stored in magnetic or other accumulators and read out by any convenient means such as an oscilloscope or an electric typewriter. The crystals may be coupled optically to other light sensitive means such as photographic film, the eye and the like.

Combinations of photomultiplier tubes having their own anhydrous chambers or enclosures for the calcium iodide provide an article of manufacture capable of delivering almost twice the electrical signal of a similar unit containing a crystal of thallium activated sodium iodide.

The accompanying drawings forming part of the instant invention are to be read in conjunction therewith and in which like reference numerals are used to indicate like parts of the various views.

Figure 1:
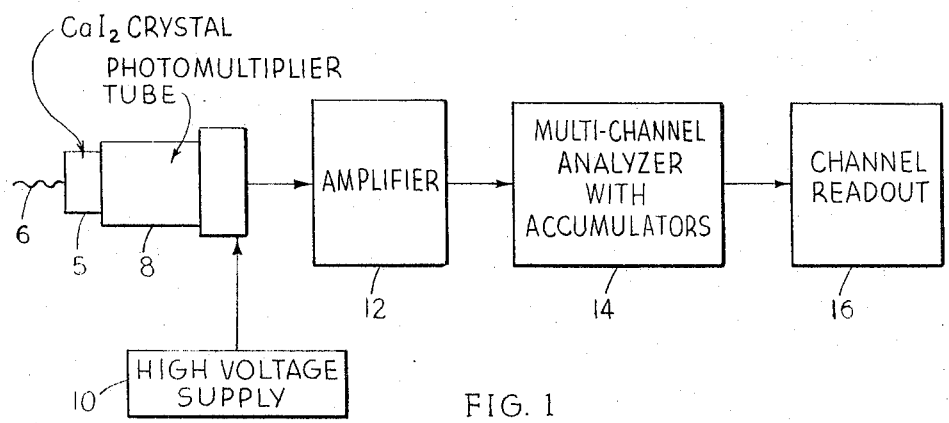
FIG. 1 is a diagram in functional block form illustrating the components of a detector system which may be used in combination with the calcium iodide crystals of the present invention.

As hereinbefore indicated, the calcium iodide scintillators of the present invention are prepared by growing a crystal of the material under a vacuum or inert atmosphere. The starting material (calcium iodide) which is to be used must be fully dehydrated before being fused to form the melt from which the crystal is made. Any of several procedures for preparing the dehydrated calcium iodide starting material may be used.

In order that those skilled in the art may better understand how the present invention can be carried into effect, the following examples are given by way of illustration and not by way of limitation. All parts and percentages are by weight unless otherwise specified:

The following example sets forth a preferred method of preparing calcium iodide which is used as the basic starting material for growing the scintillation crystals of the present invention.

EXAMPLE A

In a suitable vessel of glass, stainless steel, or platinum, hydriodic acid (47 percent solution) 790 parts was added to calcium carbonate 215 parts stoichiometrically in excess of the calcium, boiled to remove $CO_2$, and made alkaline with calcium oxide. The resulting reaction mass in the form of a slurry was filtered for insolubles and made acid with additional 47 percent aqueous hydrogen iodide to a pH below 1. The filtrate was boiled to concentrate the solution through a continually rising boiling point to 146° C. The resulting highly concentrated liquor was cooled to 5° C. to form calcium iodide hexahydrate in crystalline form. The mother liquor was poured off and the crystals were spread loosely in an inert tray of quartz or a resinous material such as polytetrafluoroethylene to a depth of approximately 1 inch. The filled tray was then placed in a vacuum drying oven equipped with a vapor trap cooled with solid $CO_2$. The oven was then evacuated and pumping continued over a period of 24 to 48 hours, with no heat applied, until a pressure of 0.1 mm. Hg absolute or less was attained. The calcium iodide was then heated slowly to about 75 to 80° C., over an interval of 40 to 60 hours, and held at this temperature for approximately 24 hours, or until a pressure of about 0.01 to 0.03 mm. Hg absolute was attained as measured by a Pirani-type vacuum gauge.

Roughly the above example is illustrative of the preparation of batches up to about 2000 grams or slightly higher spread out at a depth of slightly above 1 inch. Preferably the thinner the layer of material the better. Batches much larger than 2000 grams may not dehydrate as rapidly as rates set forth in the above example; again this is greatly dependent on the depth of the material more so than the actual size of the batch.

The technique of heating and evacuating to dry a material is well known to those skilled in the art. Generally, the evacuation procedure progresses at increasing rates depending on the temperature of the cold trap of the evacuating system, the colder the trap the more efficient the system. Liquified gases may be used to cool the trap.

Figure 4:
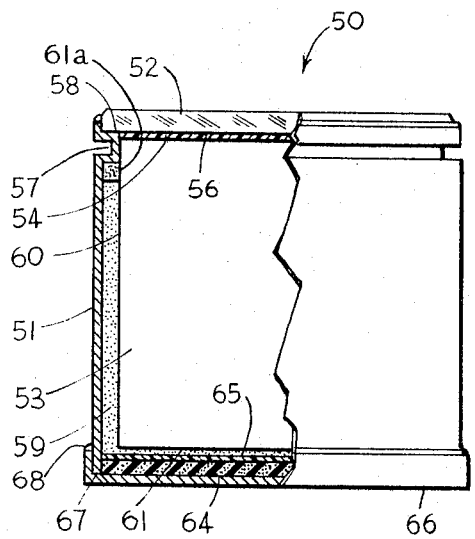
FIG. 4 illustrates partly in elevation and partly in cross-section a hermetically sealed container with a calcium iodide scintillation crystal therein.

The resulting nearly anhydrous crystals of calcium iodide were then placed in an ampoule of fused silica, or other suitable material, wherein final drying was accomplished by evacuating and slowly heating up to about 200° C. or higher over a period of about 24 hours. The ampoule was sealed off under a vacuum of about 0.01 mm. Hg absolute or less and placed in a growing furnace of the Stockbarger type as described in U.S. Patent 2,149,076. After fusion and growth from the melt by lowering the crucible at a rate of about 1 to 6 mm. per hour, the ampoule and grown ingot were cooled to room temperature over a period of 48 to 72 hours. The resulting crystal was removed from the ampoule in a dry box having a substantially anhydrous atmosphere with a dew point of −60° C. or less, cut to size and "canned" in a hermetically sealed container such as shown in FIG. 4.

Preferably the rate of growth is kept below 10 mm. per hour and the pressure in the ampoule below 0.1 mm. Hg absolute. (Even trace leakage is undesirable.) Alternately the ampoule may be back-filled with an inert dry gas such as the noble gases.

Twelve sample crystals were prepared according to the procedure outlined in the above example. After ten of the twelve samples (excluding III and VIII) were tested for properties as scintillators, they were analyzed spectrographically for impurities using a Jarrell-Asch spectrograph. The results of these analyses are found in the following Table I. The only impurities found to be in all of the samples are aluminum, copper, iron, magnesium, manganese, and silicon.

Elements looked for but which were not found were the following: antimony, arsenic, barium, beryllium, bismuth, cadmium, cobalt, gallium, germanium, gold, indium, lanthanum, lithium, mercury, molybdenum, phosphorus, thallium, and europium.

Materials which may be employed to prepare the calcium iodide starting material used in growing the scintillation crystals of the present invention include reagent grade calcium carbonate as sold by Mallinckrodt Chemical Company and a 47 percent aqueous solution of hydriodic acid which meets the specification for reagent purity. The purity specification of these materials are set forth as follows:

TABLE I.—SPECTROGRAPHIC IMPURITIES IN CaI₂ SCINTILLATORS APPROXIMATE VALUES (SEE LEGEND)

| Ex. No. | Aluminum | Boron | Chromium | Copper | Iron | Lead | Magnesium | Manganese | Platinum | Silicon | Silver | Sodium | Strontium | Titanium |
|---|---|---|---|---|---|---|---|---|---|---|---|---|---|---|
| I | M– | VFT– | EFT+ | VFT | FT+ | – | FT+ | EFT | – | W | – | – | – | FT+ |
| II | W– | – | VFT+ | EFT+ | FT– | – | FT | EFT | – | W | – | – | – | – |
| IV | W | VFT– | – | VFT | FT– | – | W | VFT– | – | T– | – | – | – | – |
| V | T+ | VFT | – | VFT+ | FT– | VFT– | T– | VFT– | – | T | – | VFT+ | FT | – |
| VI | W | VFT | – | VFT+ | FT | – | T | VFT | VFT | T | – | VFT+ | – | FT– |
| VII | W+ | – | – | EFT | FT | – | FT | EFT | – | M | – | – | – | FT– |
| IX | W | – | – | VFT | FT | VFT | FT+ | VFT– | – | FT– | EFT– | – | – | – |
| X | W+ | – | – | VFT+ | FT | – | T | EFT | – | FT | EFT | T– | – | – |
| XI | T+ | – | – | VFT | VFT | VFT | FT+ | VFT– | – | W | – | – | – | – |
| XII | W | VFT | – | VFT | W | VFT | T+ | FT | – | S– | – | – | – | VFT |
| XIII* | T+ | FT | VFT | EFT | T+ | – | FT– | EFT+ | – | W– | – | T+ | – | VFT |

*Comparative sample not prepared from the reagent grade starting materials used to prepare the scintillators of Examples I–XII using Mallinckrodt's calcium iodide (not graded).

Approximate Values:
VS = Very strong, over 5%.
S = Strong, 1–5%.
M = Moderate, .1–1%.
W = Weak, .01–.1%.
T = Trace, .001–.01%.
FT = Faint Trace.
VFT = Very Faint Trace.
EFT = Extreme Faint Trace.
– – = Not detected.
Blank = Not specifically Checked.

Each of the samples was tested for its integrated light output using a conventional system such as that illustrated in FIG. 1 (see description infra). The results of the tests are shown in Table II using a standard thallium activated sodium iodide crystal for comparison.

TABLE II.—RELATIVE RESPONSE FROM CESIUM¹³⁷ RADIATION

Example No.: Percent pulse-height relative to NaI(T1) [1]

| | |
|---|---|
| I | 87.4 |
| II | 91.5 |
| III | 95 |
| IV | 116 |
| V | 122 |
| VI | 153 |
| VII | 155 |
| VIII | 157 |
| IX | 158 |
| X | 168 |
| XI | 170 |
| XII | 185 |
| XIII | 68.5 |

[1] Standard commercial thallium activated sodium iodide scintillation crystal containing from about 0.07 to about 0.40 percent thallium iodide (see report by J. A. Harshaw et al.; AEC Report NYO 1577; 1952).

It has been found that the values for the pulse height measurements of each crystal can be correlated roughly with the pH of an aqueous solution of the crystalline material. Ten percent solutions of a selected part from each sample were made up using deionized water and tested immediately for pH using a Beckman pH meter. The part selected was carefully freed from the outer surface where a small amount of hydrolysis possibly might have taken place. It was found that the solutions of the better samples (VI–XII) had a pH in the range of from 6 to 9 and that the solutions of the poorer samples had a pH ranging from 9 to 10.5. Solutions of the excellent samples (X–XII) had a pH between 6.5 and 8.

While the reasons for this rough correlation are not fully understood, one possible explanation is that the higher pH values indicate that the better samples were prepared with less moisture or oxygen pick-up and were therefore less contaminated thereby. It is to be understood by those skilled in the art that this possible explanation is not to be construed necessarily as being accurate: it is offered only to aid those skilled in the art in understanding the invention and not to limit in any way the scope thereof.

$CaCO_3$

| Impurities | Percent | Impurities | Percent |
|---|---|---|---|
| Alkalinity | (¹) | Oxidizing substances as nitrate ($NO_3$) | 0.005 |
| $NH_4$ | 0.003 | Phosphate ($PO_4$) | 0.001 |
| Ba | 0.005 | Potassium (K) | 0.01 |
| Cl | 0.001 | Silica ($SiO_2$) | 0.001 |
| Heavy metals (as Pb) | 0.001 | Sodium (Na) | 0.0026 |
| Insoluble in HCl and $NH_4OH$ Ppt. | 0.005 | Strontium (Sr) | 0.10 |
| Fe | 0.001 | Sulfate ($SO_4$) | 0.005 |
| Mg | 0.01 | | |
| Other alkalies | (²) | | |

[1] To pass test (ACS Spec.).
[2] To pass test (at least as good as ACS Spec.).
NOTE: Assay ($CaCO_3$ after 2 hrs. at 285° C.) 99.95–100.05 percent.

HI: Percent
As .0005
Cl+Br .05
HM as Pb .001
Fe .001
Ignition Pres. .005
$SO_4$ .005
P .003
Free I .088
Sp. Gravity 1.51
HI 46.83

A spectrographic analysis of a sample of HI acid having the above specifications evaporated a non-volatile residue constituting 0.01 percent of the original liquid is set forth in the following Table III:

TABLE III

| | Values | Elements looked for but not found | |
|---|---|---|---|
| Al | FT+ | Antimony | Lithium |
| B | VFT+ | Arsenic | Mercury |
| Cd | T– | Barium | Molybdenum |
| Ca | T | Beryllium | Platinum |
| Cr | W+ | Bismuth | Strontium |
| Cu | T+ | Cobalt | Thallium |
| Fe | W– | Gallium | Tin |
| Pb | VFT+ | Germanium | Vanadium |
| Mg | T+ | Gold | Zinc |
| Mn | VFT– | Indium | Zirconium |
| Ni | W | Lanthanum | |
| P | M– | | |
| Si | W | | |
| Ag | VFT+ | | |
| Na | T– | | |
| Ti | FT– | | |

The above specifications for the calcium carbonate and hydriodic acid reactants are given only as examples of preferred minimum purities. Reactants having specifications outside the above maximum limits may be used also.

Slow, controlled raising of the temperature during the heating to dehydrate is important because accelerated heating permits the water of hydration to react with the calcium iodide. Other methods may be used to prepare the dehydrated calcium iodide starting material of the present invention as long as heating of the hydrate is controlled. Instead of slowly heating the calcium iodide hydrate to complete dehydration, the calcium iodide hydrate may be partially dehydrated and then distilled from a platinum crucible in a quartz tube at 820° C. See W. J. McCreary, J.A.C.S., 77, pp. 2113-4 (1955).

Broadly, the crystals of the present invention are prepared by removing the heat of fusion through the continually forming solid material. The crystal growing procedures of Stockbarger and Kyropoulos involve heating and fusing the dehydrated calcium iodide starting material in a first zone. The temperature of this first zone is maintained at least above the fusion point of the melt. An incipient crystal growth is developed at the point of lowest temperature in the melt and the melt with the incipient crystal growth is slowly moved into a second zone maintained at a temperature below the fusion point of the melt.

The calcium iodide scintillators prepared according to the present invention may be used advantageously in a conventional system for measuring radiation pulse-height. The scintillation crystals of the present invention particularly may be used in systems designed for measuring integrated radiation output or intensity.

Exemplary of such a system is that shown in FIG. 1 where a scintillation crystal 5 prepared according to the present invention is placed in the path of ionizing radiations 6 to be measured. The scintillation crystal 5 is optically coupled to a photomultiplier tube 8 (see FIG. 2 infra) which responds to fluoroscent light or photons being emitted from the crystal as it is being impinged upon by the radiation 6, converting the photons into negatively going electrical pulses or signals. These signals are fed to a linear amplifier 12 which is coupled electrically to the output of the photomultiplier tube via a preamplifier and a delay line (see FIG. 3 infra). The linear amplifier 12 gives a voltage proportional to the impressed charge from the photomultiplier 8. A multichannel analyzer 14 electrically connected to the amplifier 12 receives infinitesimally spaced electrical pulses which vary in magnitude, sorts them according to their intensity and stores them in an array of magnetic accumulators each of which is capable of counting the signals or pulses received by the particular accumulator.

Figure 3:
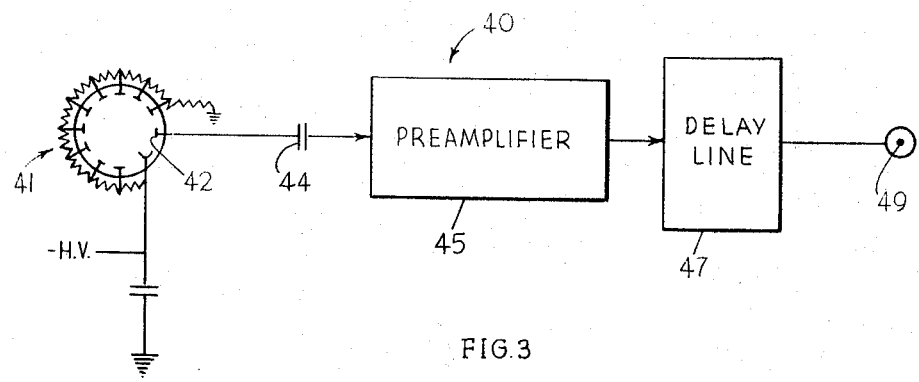
FIG. 3 is a diagram in functional block form of a conventional pulse transmitting and pulse shaping system for connecting a photomultiplier to an amplifier such as in the arrangement illustrated in FIG. 1.

Referring to FIG. 3, there is shown in block form a conventional pulse transmitting and shaping system 40 for transforming the electrical signals or pulses generated by the photomultiplier tube 41 into signals having the proper characteristics for analysis.

The output or last dynode 42 is coupled through a capacitor 44 to a preamplifier 45 providing a driving source to transmit effectively the signal received from the photomultiplier 41. While a cathode follower is commonly used as the preamplifier, a low impedance circuit such as the White follower is preferred. The output of the preamplifier 45 is then fed to a delay line 47 where the pulse or signal is shaped into a square wave of very brief duration. The characteristics of the shaped pulse are such that successive pulses may be differentiated easily from each other. Each shaped pulse is then received at the terminal 49 which may be coupled electrically to a linear amplifier in a system such as shown in FIG. 1.

Specifically the scintillation crystals of the present invention may be used advantageously with a system comprising the following: a photomultiplier comprising a 3-inch tube having an S-11 cathode spectral response and ten secondary emitting elements (dynodes) e.g. the Dumont 6363; a linear amplifier based on the Argonne A-61 design for use with scintillation crystals; amplifiers based on this well known design accept the negative going pulses of the photomultiplier tube, amplify and invert them to a peak height maximum of 100 volts (one particular model based on this design is the Model 30-7 of Radiation Instrument Development Laboratories, Inc.); a multichannel analyzer of the type described in an article by R. W. Schumann et al., Rev. Sci. Instrument, 27, 675 (1956); a transistorized model based on this design is the Model 34-12 having 400 channels (sold by the Radiation Instrument Development Laboratories, Inc.); and a capacitor having a resistance of 200,000 ohms of 200K and a capacitance of 40 micro-microfarads.

Figure 5:
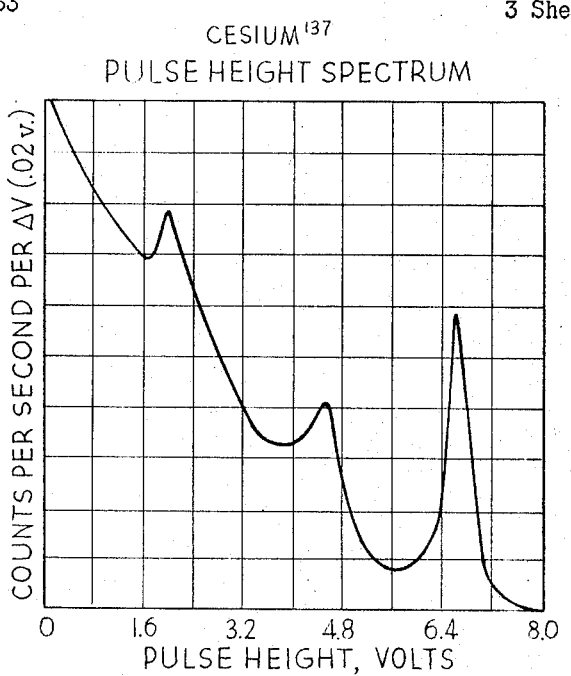
FIG. 5 illustrates the pulse height spectrum of cesium$^{137}$ using a particular calcium iodide scintillation crystal of the present invention.

Using these preferred components in the system illustrated in FIG. 1 and the calcium iodide crystal of Example XII as the scintillator, the radiation intensity of cesium[137] as analyzed in the manner set forth above. The resulting pulse-height spectrum of cesium[137] is illustrated in the graph of FIG. 5. The pulse-height obtained from this crystal was about 185 percent of that obtained from the standard commercially available thallium-activated sodium iodide crystals.

Further characterizing the crystals of the present invention is the resolution of the pulse-height spectrum curve which is defined as the width of the curve at half height of the peak divided by the pulse-height. While the materials of the present invention may have resolution values of 8 percent or below, materials having resolutions of up to about 20 percent or even higher are considered useful and are also considered to fall within the scope of the present invention. The preferred scintillation crystals of the present invention have resolution values below 10 percent.

The calcium iodide scintillators of the present invention may be made having various pulse-heights depending on the degree of care taken in preparing and growing the crystal. The invention is intended to include all of those materials which are useful as scintillators particularly those having pulse-heights of at least 60 percent of the standard thallium activated sodium iodide. While the materials of the present invention may be made consistently to have a decay constant of 0.55 microsecond or less, materials having a decay constant of up to 10 microseconds or even higher are considered useful and therefore form part of the present invention.

Figure 6:
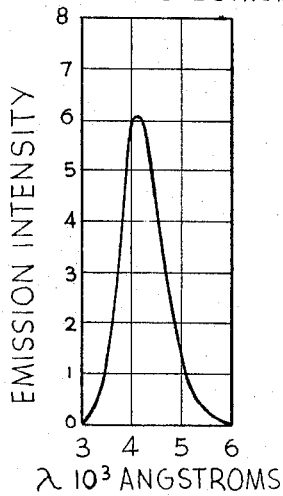
FIG. 6 illustrates a curve of the emission spectrum of the crystal of the present invention obtained from excitation with cobalt$^{60}$.

The emission spectrum (with exitation from a cobalt[60] source) of this crystal is shown in FIG. 6. The emission peak is located at 4100±40 angstroms and has a width at half height of the emission peak of 980±60 angstroms. The crystals of Examples I-XI have emission peaks similar to that obtained for the crystal of Example XII falling within 4100±40 angstroms.

The emission spectrum of the calcium iodide crystals of the present invention characterizes these crystals as being new and different scintillators from those of other calcium iodide based compositions. This emission peak particularly characterizes the instant material from the europium activated calcium iodide crystals having an emission peak located at about 4700 angstroms.

The scintillation crystals of the present invention may be used in other conventional systems for the detection and/or analysis of ionizing radiations. Specifically, examples of systems which may advantageously use the instant calcium iodide crystals are found in U.S. Government publications by the Atomic Energy Commission ORNL-2808/ORINS-30 relating to biology and medicine. The former is by D. A. Ross, Medical Gamma-Ray Spectrometry, Oak Ridge Institute Nuclear Studies and the latter is by C. C. Harris et al., Basic Principles of Scintillation Counting for Medical Investigators, Oak Ridge National Laboratory.

The scintillation crystals of the present invention consisting of calcium iodide may be used with systems for detecting and analyzing ionizing radiations from atomic energy reactors such as betatrons and cyclotrons, nuclear fission and fusion, synchrotrons and X-ray apparatuses. The type of radiation to be detected or analyzed partly determines the minimum mass needed to stop a significant amount of radiation. It has been found that crystals having thicknesses as low as 0.003 inch may be used to detect X-rays. A crystal however must be at least 0.01 inch thick to stop enough gamma radiation to be useful.

The calcium iodide crystals of the present invention being substantially transparent to about 2300 angstroms absorb very little radiation having wavelengths above this value, although there is noticeable fluorescence from the crystals when they are being impinged upon by radiation having wavelengths up to about 2500 angstroms.

For scintillating purposes the crystals of the present invention may be used effectively to detect and analyze radiation having energies as low as 22 k.e.v. (kiloelectron volts). However, the crystals do give off light from radiations having energies as low as 5-6 e.v. The crystals may be used for purposes other than as scintillators such as screens for television sets, fluoroscopes, and the like.

As previously mentioned, the scintillation crystals of the present invention are extremely hygroscopic and must be kept at all times in a substantially anhydrous atmosphere. When packing, canning or using the instant crystals, it is of advantage to perform all of the operations in an atmosphere having a dew point of −60° C. or less. Moreover, if for some reason the crystal is to be used outside of a hermetically sealed container such as in FIGS. 2 and 4 (see description infra) it is considered within the scope of the invention to house the entire detector or analyzer apparatus in a dry chamber along with the crystal.

Figure 2:
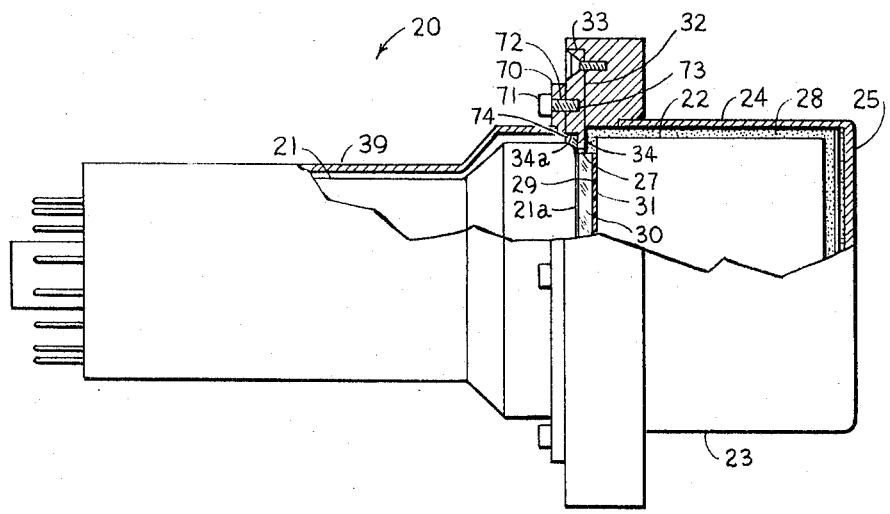
FIG. 2 illustrates partly in elevation and partly in cross-section a calcium iodide crystal of the present invention enclosed in a hermetically sealed container optically coupled to a photomultiplier tube.

Referring to FIG. 2 of the drawings, there is shown assembly 20 as a unit comprising a photomultiplier tube 21 having its light sensitive end 21a optically coupled to a calcium iodide crystal 22 of the present invention encased in a moisture-proof chamber 23 extending axially beyond the body of the tube 21. The moisture-proof chamber generally comprises cylindrical wall 24 with an integral flat bottom 25 and an opening 27 facing the interior of the photomultiplier tube 21. The chamber is advantageously composed of a radiation permeable material such as aluminum, stainless steel, and the like.

The crystal 22 is snugly packed in a substantially anhydrous granular material 28, highly light reflective in character. The top 29 of the crystal is optically cemented to a transparent window 30 of glass or quartz with a layer of an optically transparent cement. Preferably, an epoxy resin is used such as (clear R-313).

Coaxially surrounding the upper end of the wall 24 is an outwardly extending flange 31 provided with an annular recessed seat 32. A ring 33 flushly fitted into the seat 32 is provided with a radially inwardly extending thinner portion 34 providing a seat 34a for registering the light sensitive end 21a of the tube 21 with the opening 27. A ring 74 of epoxy resin is advantageously used to firmly fix the tube to the seat 34a. The ring 33 is drawn tightly into the seat 32 by a series of bolts 35 passing through holes 36 (one shown) and threadably engaging tapped holes 37 in the flange 31. The inner portion 34 being radially coextensive with an outer portion 38 of the window forces downwardly the window together with the crystal 22 and the granular material until the desired compactness is attained.

A magnetic shield 39 surrounding the tube 21 supports an outwardly extending flange 70 for securing the tube 21 to the chamber 24 with a series of bolts 71 extending through holes 72 (one shown) and threadably engaging tapped holes 73 in the ring 33.

Referring to FIG. 4, there is shown a hermetically sealed scintillator unit 50 designed for universal usage. The unit 50 generally comprises a cylindrical container body 51 having a transparent glass or quartz window 52 hermetically sealed at one end thereof and a calcium iodide crystal 53, prepared according to the present invention, optically coupled to the inner side 54 of the window 52. Optionally a layer 56 of an optical fluid is used to insure a uniform optical coupling across the interface between the window 52 and the calcium iodide crystal 53.

A square cross-sectioned annular groove 57 in container body 51 conveniently provides an annular seat 58 supporting the window 52. The window is hermetically sealed in the seat with a moisture impermeable material such as an epoxy resin and the like.

The calcium iodide crystal 53 is held firmly against the window by a highly reflective packing 59 surrounding the outer cylindrical surface 60 and the bottom surface 61 of the crystal 53. Granular aluminum oxide or magnesium oxide which have been dehydrated are particularly preferred as the packing material. A minimum amount of a fibrous material 61a such as fiberglass may be packed around the extreme upper portion of the crystal 53 to prevent the granular packing from being sifted beyond the annular groove 57.

Beneath the packing 59 and the crystal 53 is a compressible pad 64 composed of a material such as sponge rubber, and optionally a polyethylene disc 65 between the pad 64 and the packing 59.

A back cap 66 fitting over the lower end of the container body 51 supports the assembled contents of the unit. Preferably the pad 64 extends slightly axially beyond the bottom of the container body 51 so that the pad 64 is maintained under compression by the cap 66 whereby the crystal 53 is being forced continually against the inner surface of the window 52 from the biasing action of the pad 64.

The cap 66 is hermetically sealed to the container body at the inner juncture 67 and at the outer juncture 68 of the cap with the body. A moisture impermeable material similar to that used for sealing the window 52 to the body may be used.

Preferably the container body 51 and the cap 66 are composed of a radiation permeable material for obvious reasons. Examples of such material include aluminum, magnesium, etc.

Although specific embodiments of the invention have been shown and described, it will be understood that they are but illustrative and that various modifications may be made therein without departing from the scope and spirit of this invention as defined in the appended claims.

What is claimed is:

1. A scintillator of a transparent optically integral crystalline material consisting of substantially pure anhydrous calcium iodide, and means for maintaining said material in an anhydrous condition, said calcium iodide being free from added activators.

2. A scintillator according to claim 1 having a decay constant of less than ten microseconds and in which said material has a thickness of not less than three-thousandths of an inch.

3. In combination, a sealed container providing a substantially anhydrous zone and a scintillator in said zone, said scintillator comprising a transparent optically integral crystalline material consisting of substantially pure calcium iodide free from added activators.

4. In combination, a light detector having a detecting element and a chamber optically coupled to the detecting element, said chamber having a substantially anhydrous atmosphere and a scintillator within said chamber, said scintillator comprising a transparent, optically integral, substantially pure crystalline calcium iodide free from added activators.

(References on following page)

References Cited by the Examiner

UNITED STATES PATENTS 3,068,359  12/1962  Carlson _____ 250—71.5
3,127,512  3/1964  Monaghan _____ 250—71.5

FOREIGN PATENTS 732,893  6/1955  Great Britain.

OTHER REFERENCES

Scintillations in Thallium Activated $CaI_2$ and CsI by Sciver et al., Physical Review, vol. 84, pp. 1062 and 1063.

RALPH G. NILSON, *Primary Examiner.*

JAMES W. LAWRENCE, *Examiner.*

S. ELBAUM, *Assistant Examiner.*